(12) United States Patent
Bar et al.

(10) Patent No.: US 10,817,191 B2
(45) Date of Patent: Oct. 27, 2020

(54) STORAGE SYSTEM AND METHOD FOR THERMAL THROTTLING VIA COMMAND ARBITRATION

(71) Applicant: Western Digital Technologies Inc., Irvine, CA (US)

(72) Inventors: Sagi Bar, Tel Aviv (IL); Galya Utevsky, Petah Tiqwa (IL); Sergey Naiman, Modiin (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 91 days.

(21) Appl. No.: 15/457,676

(22) Filed: Mar. 13, 2017

(65) Prior Publication Data
US 2018/0260152 A1 Sep. 13, 2018

(51) Int. Cl.
*G06F 3/06* (2006.01)
*G06F 1/3234* (2019.01)
*G06F 1/3225* (2019.01)
*G06F 1/20* (2006.01)

(52) U.S. Cl.
CPC ............ *G06F 3/0625* (2013.01); *G06F 1/206* (2013.01); *G06F 1/3225* (2013.01); *G06F 1/3268* (2013.01); *G06F 3/0634* (2013.01); *G06F 3/0659* (2013.01); *G06F 3/0688* (2013.01); *Y02D 10/154* (2018.01)

(58) Field of Classification Search
None
See application file for complete search history.

(56) References Cited

U.S. PATENT DOCUMENTS

| | | | |
|---|---|---|---|
| 9,152,568 B1 * | 10/2015 | Seigler | ................ G06F 12/0866 |
| 2012/0066439 A1 | 3/2012 | Fillingim | |
| 2012/0331207 A1 | 12/2012 | Lassa et al. | |
| 2015/0177994 A1 | 6/2015 | Vucinic et al. | |
| 2016/0117105 A1 | 4/2016 | Thangaraj et al. | |
| 2017/0090753 A1 * | 3/2017 | Benisty | ................... G06F 3/061 |

OTHER PUBLICATIONS

International Search Report and Written Opinion in corresponding International Application No. PCT/US2017/063648, dated Feb. 21, 2018, 14 pages.

* cited by examiner

*Primary Examiner* — Gary W. Cygiel
(74) *Attorney, Agent, or Firm* — Morgan, Lewis & Bockius LLP (57) ABSTRACT

A storage system and method for thermal throttling via command arbitration are provided. In one embodiment, a storage system is provided comprising a memory and a controller in communication with the memory. The controller is configured to determine whether a temperature of the storage system exceeds a threshold; and in response to determining that the temperature of the storage system exceeds the threshold, pause fetching of new commands from a host. Other embodiments are possible, and each of the embodiments can be used alone or together in combination.

20 Claims, 7 Drawing Sheets

STORAGE SYSTEM AND METHOD FOR THERMAL THROTTLING VIA COMMAND ARBITRATION

BACKGROUND

Storage systems generate heat as they operate. As a storage system increases performance, the power consumed to operate the storage system over time can lead to temperature increases that threaten the basic operation of the storage system, as well as the safety of the host environment in which the storage system operates. To mitigate this issue, storage systems are sometimes configured to throttle their performance when a critical temperature is reached (e.g., by inserting delays between commands or changing the operating speed of various components within the storage system).

DETAILED DESCRIPTION

By way of introduction, the below embodiments relate to a storage system and method for thermal throttling via command arbitration. In one embodiment, a storage system is provided comprising a memory and a controller in communication with the memory. The controller is configured to determine whether a temperature of the storage system exceeds a threshold; and in response to determining that the temperature of the storage system exceeds the threshold, pause fetching of new commands from a host.

In some embodiments, the controller comprises a command arbiter configured to pause fetching of new commands from a submission queue in the host.

In some embodiments, the controller is further configured to perform the following after pausing fetching of new commands from the host: process commands queued in the storage system; and after the commands queued in the storage system have been processed, enter a low power state.

In some embodiments, the low power state is entered for an amount of time greater than or equal to an amount of time needed to lower the temperature of the storage system below the threshold but less than an amount of time required to reach a timeout condition on the host.

In some embodiments, the controller is further configured to: after a period of time after entering the low power state, determine whether the temperature of the storage system still exceeds the threshold; and in response to determining that the temperature of the storage system still exceeds the threshold, repeat pausing fetching of new commands from the host and entering the low power state.

In some embodiments, the controller is further configure, after it is determined that the temperature of the storage system exceeds the threshold but before pausing fetching of new commands from the host, fetch new commands from the host for an amount of time to avoid a time-out condition on the host.

In some embodiments, the controller is further configured to inform the host that the storage system is pausing fetching of new commands from the host.

In some embodiments, the memory comprises a three-dimensional memory.

In some embodiments, the storage system is embedded in the host.

In some embodiments, the storage system is removably connected to the host.

In another embodiment, a method is provided comprising determining whether a storage system has reached a critical temperature; and in response to determining that the storage system has reached the critical temperature: temporarily stopping a flow of new commands from a host; processing commands queued in the storage system; and after processing the commands queued in the storage system, operating the storage system in a mode that reduces temperature of the storage system.

In some embodiments, the method further comprises, after determining that the storage system has reached the critical temperature but before temporarily stopping the flow of new commands from the host, retrieving at least one new command from the host to avoid a time-out of the at least one new command.

In some embodiments, a memory in the storage system comprises a three-dimensional memory.

In some embodiments, the storage system is embedded in the host.

In some embodiments, the storage system is removably connected to the host.

In another embodiment, a storage system is provided comprising a memory; means for refraining from retrieving new commands from a host in response to the storage system reaching a certain temperature; means for executing commands previously received by the storage system; and means for operating the storage system in a reduced-temperature mode after executing the commands previously received by the storage system.

In some embodiments, the means for refraining comprises a command arbiter.

In some embodiments, the memory comprises a three-dimensional memory.

In some embodiments, the storage system is embedded in the host.

In some embodiments, the storage system is removably connected to the host.

Other embodiments are possible, and each of the embodiments can be used alone or together in combination. Accordingly, various embodiments will now be described with reference to the attached drawings.

Figures 1A, 1B:
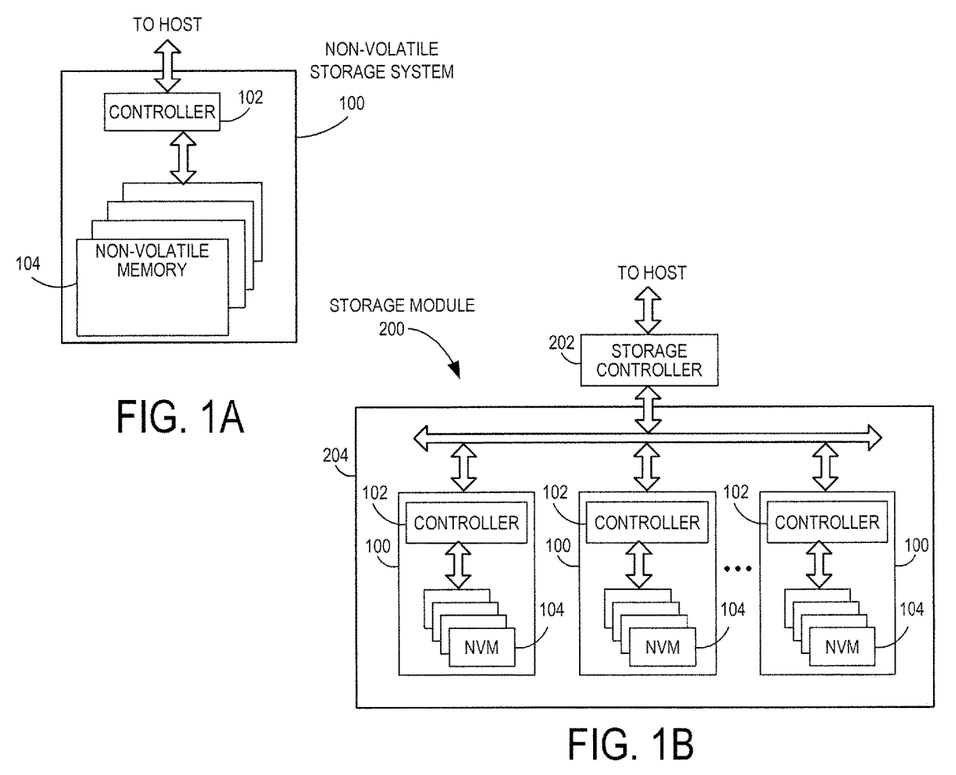
FIG. 1A is a block diagram of a non-volatile storage system of an embodiment.
FIG. 1B is a block diagram illustrating a storage module of an embodiment.
Figure 1C:
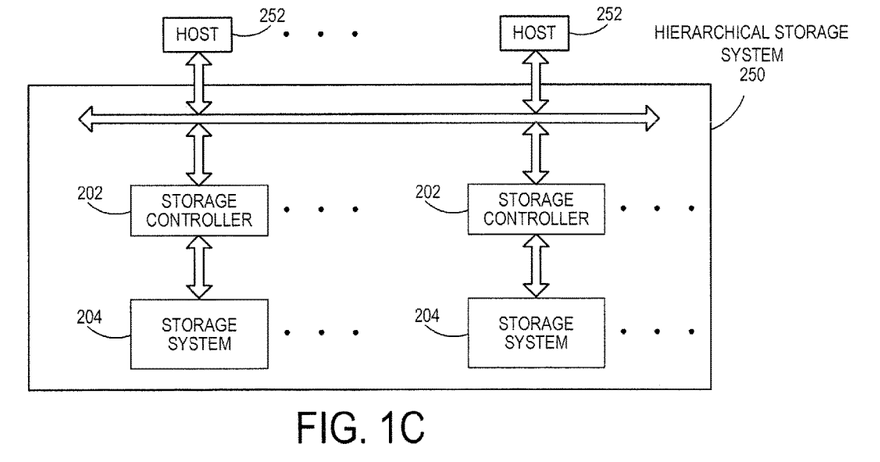
FIG. 1C is a block diagram illustrating a hierarchical storage system of an embodiment.

Turning now to the drawings, storage systems suitable for use in implementing aspects of these embodiments are shown in FIG. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
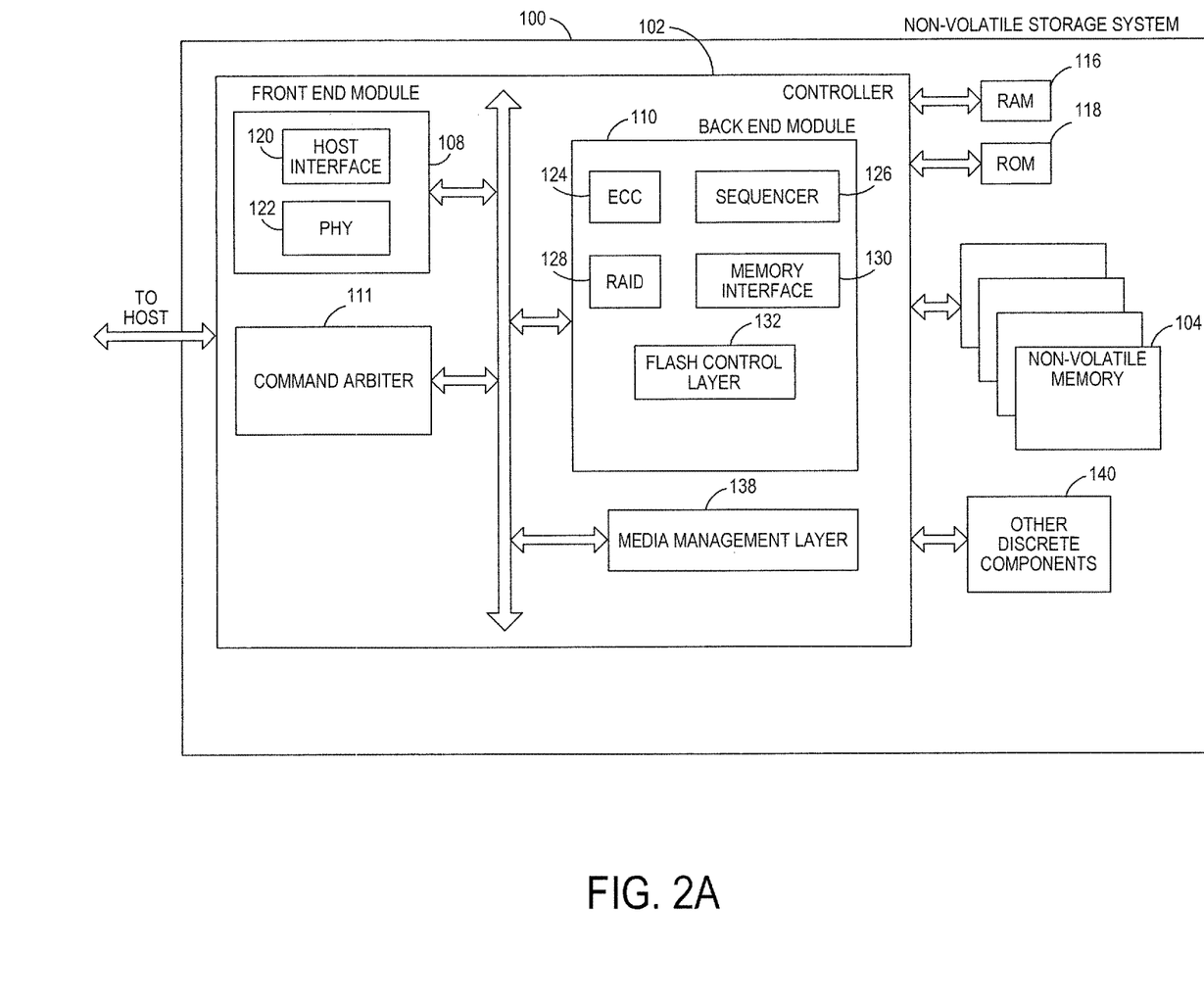
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a command arbiter 111, which is discussed in more detail below, and can be implemented in hardware or software/firmware.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
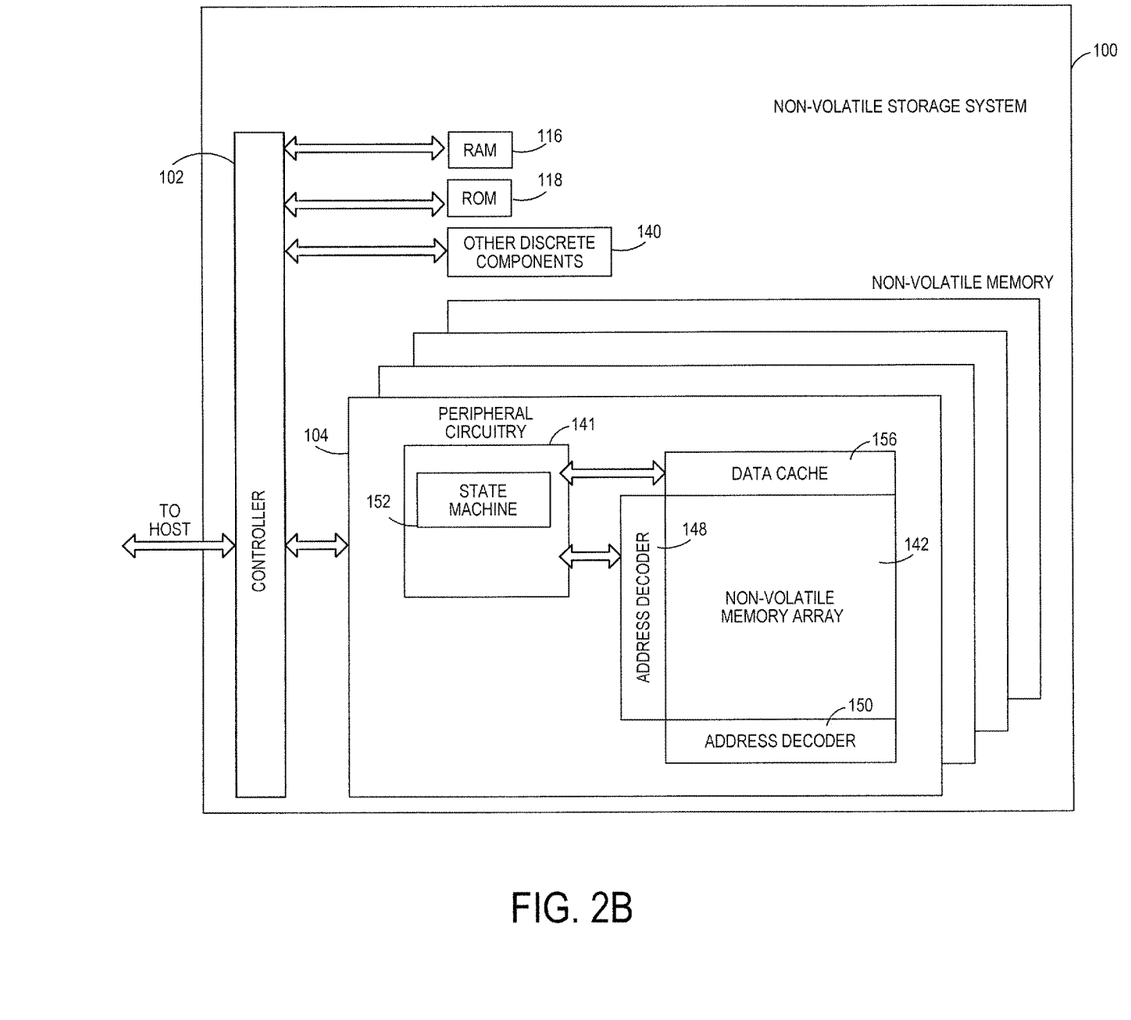
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to the controller 102. Non-volatile memory die 104 further includes a data cache 156 that caches data.

Figure 3:
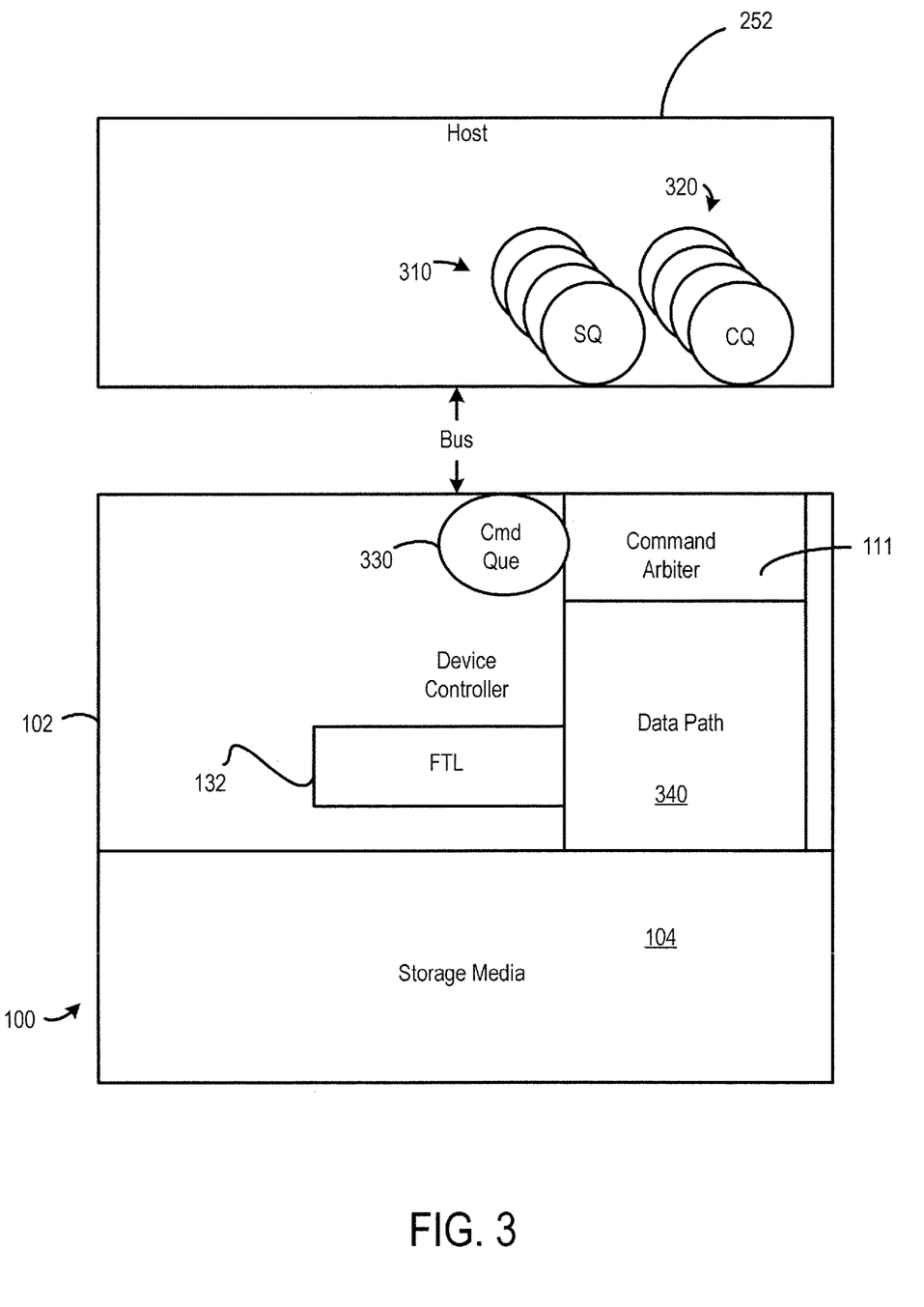
FIG. 3 is a block diagram of a host and storage system of an embodiment.

FIG. 3 is a block diagram of one particular implementation of a host 252 and storage system 100 that are configured in accordance with the Non-Volatile Memory Express (NVMe) protocol. It should be noted that this is merely one implementation and that other implementations can be used. As such, details of this example or the use of NVMe should not be read into the claims unless expressly recited therein.

As shown in FIG. 3, in this particular example, the host 252 comprises a plurality of submission queues (SQ) 310 and a plurality of completion queues (CQ) 320. In one implementation, the plurality of submission queues (SQ) 310 and the plurality of completion queues (CQ) 320 have a 1:1 correlation, while in another implementation, the plurality of submission queues (SQ) 310 and the plurality of completion queues (CQ) 320 do not have a 1:1 correlation. The storage system 100 comprises storage media 104 and a controller 102, which comprises a command arbiter 111, a flash translation (or control) layer 132, an internal command queue 330 (multiple internal command queues can be used), and a data path 340.

In operation, the host 252 may notify the storage system 100 of the submission queue(s) 310 and completion queue(s) 320 by sending the base address for each queue to the storage system 100. The submission queue (SQ) 310 may be based on a ring buffer with a head pointer and a tail pointer. After creating the submission queue(s) (SQ) 310 and notifying the storage system 100 about the created submission queue(s) (SQ) 310, the host 252 may write a command (or several commands) to the submission queue (SQ) 310. In one implementation, the storage system 100 is unaware that the host 252 has updated the submission queue (SQ) 310 with commands, since the host 252 is just updating its own memory. So, to notify the storage system 100 that there are command(s) waiting in the submission queue (SQ) 310, the host 252 can write to a submission queue tail doorbell register (not shown) in the storage system 100. In practice, each submission queue (SQ) 310 can have a corresponding submission queue tail doorbell register in the storage system 100, so that when the host 252 updates a particular doorbell register (correlated to a particular submission queue), the storage system 100 can determine, based on the doorbell register, which particular submission queue (SQ) 310 has been updated.

In the general case, there may be several submission queues (SQ) 310 with potentially many pending commands in the several submission queues. Thus, the command arbiter 111 can arbitrate between the various submission queues (SQ) 310 to select the particular submission queue from which to fetch the command(s). After determining which particular submission queue (SQ) 310 from which to fetch the command(s), the storage system 100 can fetch the command(s) from the particular submission queue (SQ) 310 and store the commands in its internal command queue 330. The storage system 100 then processes the command. In one implementation, the storage system 100 parses the commands and determines the steps to execute the commands (e.g., read/write/etc.). For example, for a read command, the storage system 100 can parse the command, implement the address translation using the FTL 132, and access the storage media 104 via the data path 340 to receive the data. After receiving the data, the storage system 100 can send the data to the host 252.

After completing the data transfer, the storage system controller 102 can send a completion message to the relevant completion queue (CQ) 320. The completion message may contain information as to the processing of the command(s), such as whether the command was completed successfully or whether there was an error when executing the command. In one embodiment, the host 252 is unaware that the storage system 100 posted to the completion queue (CQ) 320. So, the storage system 100 can notify the host 252 that there has been an update to the completion queue (CQ) 320. In particular, the storage system 100 can post an interrupt to the host 252 (e.g., using an MSIe interrupt). Responsive to receiving the interrupt, the host 252 can determine that there are one or more completion entries pending for the host 252 in this completion queue (CQ) 320 and can process those entries.

As mentioned above, storage systems generate heat as they operate. As storage systems increase in performance, the power consumed to operate the storage system over time leads to temperature increases that threaten the basic operation of the storage system, as well as the safety of the host environment in which the storage system operates. For example, intensive write operations may cause the storage media 104 (typically NAND flash) to rise in temperature until it reaches or exceeds the recommended operating temperature for NAND, which is generally 85° C. Controller temperatures may also rise during intensive input/output (I/O) operations, especially if the data path includes internal SRAM buffers that are read from and written to intensively as staging RAM for read operations. To maintain operation at high temperatures, the storage system may be required to reduce performance in order to allow the temperature to drop to operational levels.

To mitigate this issue, storage systems are sometimes configured to throttle their performance when a critical temperature is reached. To throttle their performance, some storage systems insert delays between commands or change the operating speed of various components within the storage system. However, several issues may be encountered with these approaches. For example, since data continues to flow through the storage system during a throttled state, albeit at a lower pace, the storage system cannot completely turn off components. This means that more power is consumed, and the cooling effect of the throttling function is diminished, thereby possibly resulting in insufficient throttling. As another example, since performance is reduced across the entire storage system, there is no differentiation between critical commands for the host and other commands. This can lead to host issues, such as timeouts and resets.

The following embodiments can address these issues by providing a storage system and method for thermal throttling via command arbitration. In general, rather than throttling specific components of the storage system 100 (e.g., reducing clock speeds, pausing between commands, etc.) in response to a critical temperature, commands are consumed as quickly as possible, and the storage system 100 selectively reduces or stalls command arbitration from the host 252. Optionally, following the execution of all commands in the internal command queue 330, the storage system 100 can be transitioned into a low power state. The storage system 100 can then gradually increase arbitration cycles as the temperature declines until full performance is achieved. This approach to thermal throttling differs from previous device-directed approaches in that it uses queue management, which is both simpler and allows for more effective host feedback.

Figure 4:
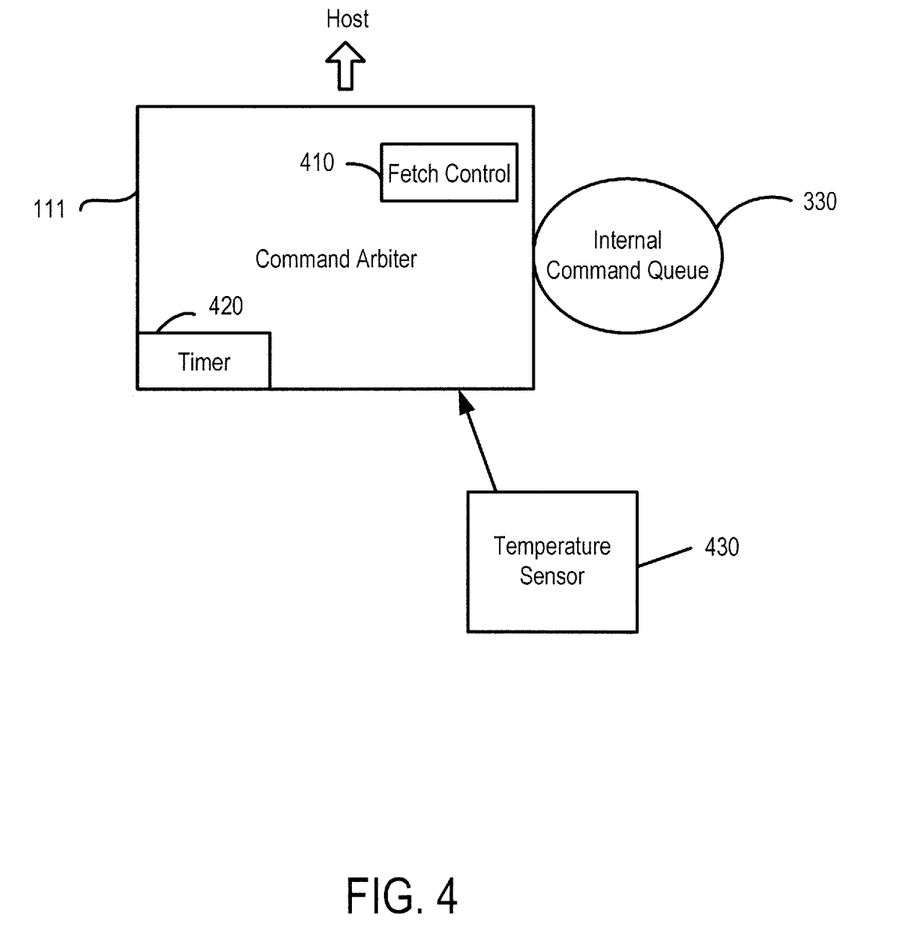
FIG. 4 is a block diagram of a command arbiter of an embodiment.

In one embodiment where the NVMe protocol is used to communicate with the host 252, this function of selectively reducing or stalling command arbitration from the host 252 can be implemented in the command arbiter 111 (of course, this is just one example, and other implementations can be used). More specifically, in one embodiment (see FIG. 4), when a triggering event for thermal throttling is detected (e.g., by a temperature sensor 430 (e.g., in the controller 102, memory 104, or other location inside or outside the storage system 100) reporting a value higher than a predefined threshold), the command arbiter 111 can use a fetch control module 410 to pause command arbitration until the temperature goes down or for a pre-defined amount of time as measured by a timer 420 in the command arbiter 111 (or by an external timer). As mentioned above, this provides a simpler thermal management solution in high-performance devices as compared to conventional thermal throttling techniques.

Figure 5:
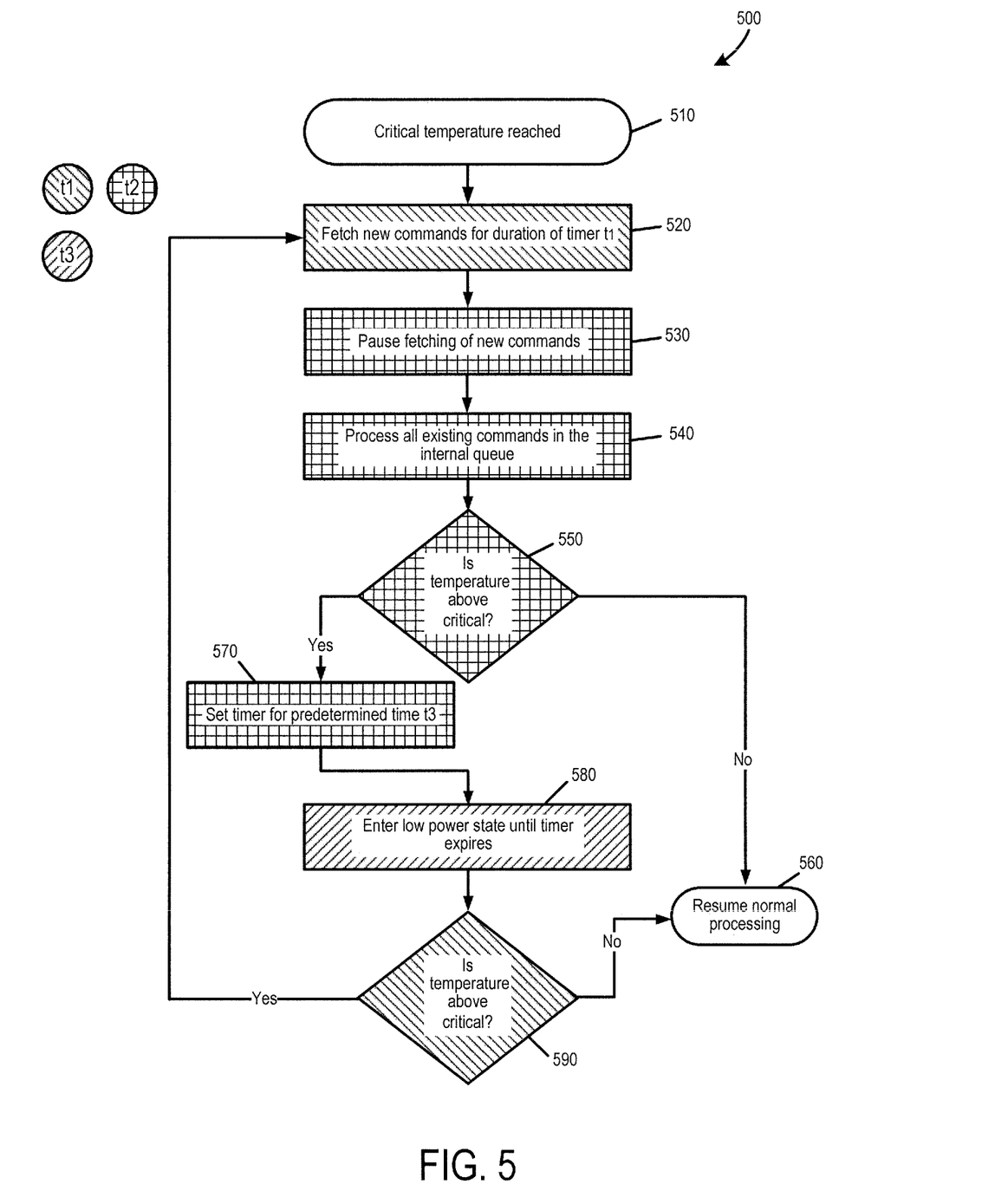
FIG. 5 is a flow chart of a method of an embodiment for thermal throttling via command arbitration.

Returning to the drawings, FIG. 5 is a flow chart 500 of a method of an embodiment for thermal throttling via command arbitration. In one embodiment, these acts are performed in the controller 102 of the storage system 100. As shown in FIG. 5, the method starts out with the storage system 100 determining that a critical temperature has been reached (i.e., that the temperature of the storage system 100 (e.g., the overall temperature of the storage system 100, the temperature of the controller 102, the temperature of the memory 104, etc.) is above a threshold) (act 510). Next, the command arbiter 111 fetches new commands from the submission queue (SQ) 310 of the host 252 for the duration of a time $t_1$ (act 520). As will be discussed in more detail below, commands are still fetched from the submission queue (SQ) 310 of the host 252 even though the critical temperature has been reached to avoid time-out of the commands in the submission queue (SQ).

Next, the command arbiter 111 pauses fetching of new commands from the submission queue (SQ) 310 of the host 252 (act 530), and the controller 102 processes all the existing commands in the internal command queue 330 (act 540). Doing this creates a window of inactivity for the controller 102, as it clears out whatever commands are in the internal command queue 330 and prevents new commands from entering the internal command queue 330. This window of inactivity is created in this embodiment because the controller 102 has control of the flow of the commands it receives from the host 252.

It is possible that after stopping fetching new command and processing the existing commands stored in the internal command queue 330, the temperature of the storage system 100 will be below the threshold temperature. So, at that point, the controller 102 can determine if the temperature is still above the critical temperature (act 550). If the temperature of the storage system 100 is below the threshold temperature, normal processing can be resumed (act 560), with the command arbiter 111 fetching new commands from the host 252 for processing. However, depending on the controller configuration, even if the controller 102 is not fetching or processing commands, the controller 102 may not cool down or cool down appreciably (e.g., because the controller 102 is performing background or other operations). In this case, the storage system 100 can enter a low power state for some amount of time. As used here, a "low power state" refers to an operating mode of one or more components of the storage system 100 (e.g., the controller 102) in which operation(s) performed by those component(s) that generate heat are reduced or avoided. Because the controller 102 is in control of when it receives commands from the host 252 in this embodiment, the controller 102 can enter the low power state without consulting with the host 252, which is in contrast with other system where a low power state could be interrupted when a host sends a command to the storage system.

So, referring back to FIG. 5, if the temperature of the storage system 100 is above the critical temperature even after stopping fetching and processing commands, the controller 102 sets the timer 420 for a predetermined time $t_3$ (act 570) and enters a low power state until the timer 420 expires (act 580). After the timer 420 expires, the controller 102 determines if the temperature is still above critical (act 590). If it isn't, normal processing is resumed (act 560). However, if it is, the controller 102 loops back to act 520, and the process begins again with new commands being fetched from the host 252 for a time $t_1$ (act 520).

As mentioned above, in one embodiment, new commands are fetched from the host 252 for a time $t_1$ and processed (acts 520 and 540) even though the storage system 100 is above the critical temperature. Continuing to fetch new commands avoids "timing out" commands in the submission queue (SQ) 310. That is, some commands need to be executed within a certain amount of time, and the storage system 100 may be responsible for getting the commands executed on time. Accordingly, because fetching and processing still take place, the method shown in the flow chart 500 of FIG. 5 slows down command fetching and processing, but it does not stop it entirely.

In one embodiment, $t_1$ can be an amount of time necessary to fill the internal queue 320, but not to execute commands, and $t_2$ (e.g., acts 530, 540, 550, 570) can be the worst-case time required to process all of the commands fetched during $t_1$.

For example, $t_1$ may be calculated as:

$t_1 = (p \times c) + s$, where p is the time it takes to fetch a single PCIe packet from the host 252 to the storage system 100 (typically on the order of 1 μs), c is the number of slots in the internal command queue, and s is a factor for the firmware execution time required to start and stop command processing; and $t_2$ may calculated as $t_2 = (c \times M)/d$, where c is the number of slots in the internal command queue, M is the maximum length of the command which takes longest to execute (generally a write command), and d is the typical rate of execution of commands of type M in the target device. For example, if c is 256, the maximum length of a write command is 128 KB, and the write speed of the device is 200 MB/s, then $t_2$ would be 163 ms—calculated as (256×0.128)/200. Alternatively, $t_2$ may be a non-determinstic measure that simply waits until the internal queue 320 is completely drained.

The period of time for being in the low power state ($t_3$) can be pre-defined as the typical time it would take the storage system 100 to reach a safe temperature but less than the time required to reach a timeout condition on the host 252. In one variation, time $t_3$ can be gradually increased over time until the temperature gradient shows an overall downward trend, and decreased if the host 252 begins to send reset instructions to the storage system 100 (which is an indication of host-side timeouts due to poor performance.)

During $t_3$, the storage system 100 may also transition into an internal low-power state. Optionally, the storage system 100 may allow the link to the host 252 to transition to a low-power mode such as the L1.2 substrate. The storage system 100 may also turn off internal power to components such as NAND, DRAM, or parts of the controller 102 to reduce power consumption and improve temperature reduction.

Figure 6:
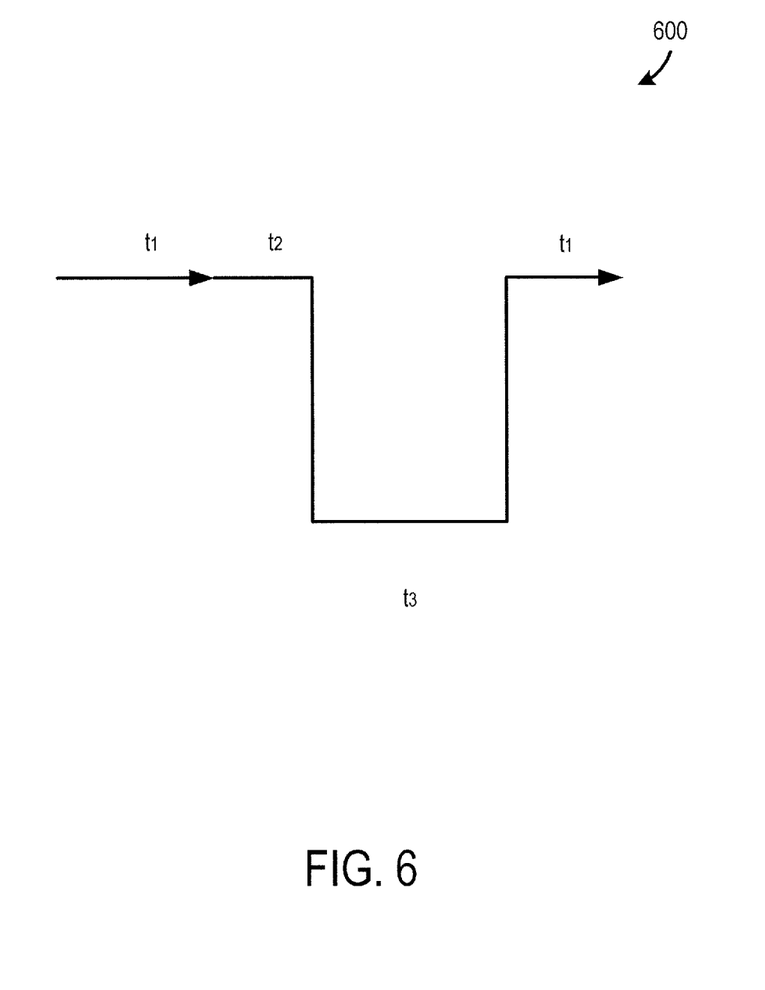
FIG. 6 is a timing diagram of an embodiment.

FIG. 6 is a graph 600 showing power consumption in the three time groups: $t_1$, $t_2$, and $t_3$. It should be noted that the time periods $t_1$, $t_2$, and $t_3$ can be any suitable time period, and the above formulas are just examples of how those time periods can be calculated. These formulas should not be read into the claims unless expressly recited therein. In one embodiment, the duration of times $t_{1...3}$ can be configured at manufacturing or during storage system 100 startup using a vendor-specific configuration mechanism.

There are many alternatives that can be used with these embodiments. For example, in the above example, the temperature of the storage system 100 is lowered by pausing fetching of commands and, optionally, entering the low power state. In one embodiment, this solution of using command arbitration to reduce temperature is used instead of other thermal throttling techniques, such as inserting delays between commands or changing the operating speed of various components within the storage system 100. However, in another embodiment, thermal control is achieved by using both command arbitration and other thermal throttling techniques.

In another alternate embodiment, the storage system 100 informs the host 252 that it is pausing fetching commands. As noted above, in one embodiment, even when the storage system 100 pauses fetching commands, the host 252 continues to store new commands in the submission queue (SQ) 310, so the storage system 100 needs to attend to those commands to prevent time-out, even if the storage system's temperature is above critical. However, if the storage system 100 can inform the host 252 that it is pausing fetching of new commands, the host 252 can slow or stop the flow of new commands into its submission queue (SQ). This provides a degree of cooperation between the host 252 and the storage system 100. The storage system 100 can inform the host 252 that it is pausing fetching of new commands in any suitable way. For example, in one embodiment, the storage system 100 signals to the host 252 that queue processing is paused using the CSTS.PP (Processing Paused) bit from the NVM Express specification, version 1.2.1, section 3.1.6. According to that specification, the CSTS.PP bit is defined for a firmware update. With this alternate embodiment, the CSTS.PP bit can be used when the storage system 100 is in the thermally-throttled state to let the host 262 know that queue processing is halted as a thermal issue. In another variation of this, the host 252 can pause upward queue processing when the CSTS.PP bit is raised following a critical temperature warning.

In another alternate embodiment, the critical temperature used to enter the throttling state can be different from the temperature used to exit the throttling state (e.g., enter at 80° C. but exit at 70° C.). The difference between the temperatures may be due to hysteresis or due to host-side constraints and may be mapped to host temperature thresholds or to warning and critical temperatures advertised by the storage system 100.

In another alternate embodiment, when weighted round robin arbitration is enabled, urgent queues can be arbitrated regularly, and only other queues can be subject to arbitration throttling. In this variation, any queue marked as urgent by the host 252 can continue to be checked for new commands after every doorbell, while other doorbells are coalesced and only checked during $t_1$. In another variation, the threshold weight of submission queues is increased gradually, such that high priority queues may also be arbitrated without throttling when the temperature threshold is less than critical. It should be noted that in these variations, other queues may be subject to starvation and may cause timeouts, and the host 252 is responsible for handling these issues (just as with regular weighted-round-robin arbitration). Furthermore, if the host 252 sends too many commands to an urgent queue, the storage system 100 may then subject the urgent queue to the same arbitration. For example, if the urgent queue consists of many sequential write commands, the storage system 100 may then transition to a non-prioritized throttling mechanism.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a non-volatile memory; and
   a controller coupled to the non-volatile memory, wherein the controller is configured to:
      determine whether a temperature of the storage system exceeds a threshold;

determine an amount of time needed to fill an internal queue of the storage system; and when the temperature of the storage system exceeds the threshold,
fetch commands, for the determined amount of time, from a host;
after fetching the commands, prevent reception of new commands from the host into the storage system; and
execute commands previously received by the storage system,
wherein the commands previously received by the storage system are not the new commands,
wherein the commands previously received by the storage system comprise the fetched commands, and
wherein when the commands previously received by the storage system comprise a read command, the controller is further configured to execute the read command by causing accessing the non-volatile memory, receiving data from the non-volatile memory, and sending the data to the host.

2. The storage system of claim 1, wherein the controller comprises a command arbiter configured to prevent reception of the new commands, from a submission queue in the host, into a command queue in the storage system, wherein the command queue is the internal queue.

3. The storage system of claim 1, wherein the controller is further configured to:
after preventing reception of the new commands from the host, process the commands queued in the storage system; and
after the commands queued in the storage system have been processed, enter a low power state.

4. The storage system of claim 3, wherein the low power state is entered for an amount of time greater than or equal to an amount of time needed to lower the temperature of the storage system below the threshold but less than an amount of time required to reach a timeout condition on the host.

5. The storage system of claim 3, wherein the controller is further configured to:
after a period of time after entering the low power state, determine whether the temperature of the storage system still exceeds the threshold; and
when the temperature of the storage system still exceeds the threshold, repeat preventing reception of the new commands from the host and entering the low power state.

6. The storage system of claim 1, wherein the controller is further configured to, after it is determined that the temperature of the storage system exceeds the threshold but before preventing reception of the new commands from the host, fetch the commands from the host for the determined amount of time to avoid a time-out condition on the host.

7. The storage system of claim 1, wherein the controller is further configured to inform the host that the storage system is preventing reception of the new commands from the host into the storage system.

8. The storage system of claim 1, wherein the non-volatile memory comprises a three-dimensional memory.

9. The storage system of claim 1, wherein the storage system is embedded in the host.

10. The storage system of claim 1, wherein the storage system is removably connected to the host.

11. The storage system of claim 1, wherein the controller of the storage system is in control of when the controller receives commands from the host.

12. The storage system of claim 1, wherein the controller of the storage system is in control of when the controller receives commands from the host, and wherein when the temperature of the storage system exceeds the threshold, the controller is further configured to enter a lower power state without consulting with the host.

13. The storage system of claim 1, wherein when the temperature of the storage system exceeds the threshold, the controller is further configured to, during the prevention of reception of the new commands, execute all commands previously stored in the internal queue in the storage system, wherein all the commands comprise the commands, and wherein all the commands are different from the new commands.

14. The storage system of claim 1, wherein the new commands comprise read commands and write commands, wherein when the temperature of the storage system exceeds the threshold, the controller is further configured to prevent reception of both the read commands and the write commands.

15. The storage system of claim 1, wherein the prevention of reception of the new commands prevents a command queue of the storage system from receiving any of commands queued in the host for submission to the storage system.

16. The storage system of claim 1, wherein the prevention of reception of the new commands is triggered, irrespective of a status of a command queue of the storage system for receiving the new commands.

17. The storage system of claim 1, wherein during the prevention of reception of the new commands, the controller is further configured to cause the host to slow or stop a flow of additional commands into a queue in the host for submission to the storage system.

18. A method comprising:
performing the following in a storage system:
determining whether the storage system has reached a critical temperature;
determining an amount of time needed to fill an internal queue of the storage system; and
in response to determining that the storage system has reached the critical temperature:
fetching commands, for the determined amount of time, from a host;
after fetching the commands, preventing reception of new commands from the host into the storage system;
processing commands queued in the storage system; and
after processing the commands queued in the storage system, operating the storage system in a mode that reduces temperature of the storage system,
wherein the commands queued are different from the new commands,
wherein the commands queued comprise the fetched commands, and
wherein when the commands queued comprise a read command, processing the commands queued comprises: accessing a non-volatile memory of the storage system, receiving data from the non-volatile memory, and sending the data to the host.

19. The method of claim 11 further comprising, after determining that the storage system has reached the critical temperature but before preventing reception of the new commands from the host, retrieving at least one new command from the host to avoid a time-out of the at least one new command.

20. A storage system comprising:

a non-volatile memory;

in response to the storage system reaching a certain temperature:
- means for fetching commands for an amount of time to fill an internal queue of the storage system;
- means for preventing reception of new commands from a host into the storage system, after fetching the commands;
- means for executing commands previously received by the storage system; and means for operating the storage system in a reduced-temperature mode after executing the commands previously received by the storage system, wherein the commands previously received by the storage system are not the new commands, wherein the commands previously received by the storage system comprise the fetched commands, and wherein when the commands previously received by the storage system comprise a read command, the means for executing the commands previously received by the storage system comprises means for causing accessing the non-volatile memory, receiving data from the non-volatile memory, and sending the data to the host.

* * * * *